United States Patent [19]

Laurent

[11] Patent Number: 5,143,254
[45] Date of Patent: Sep. 1, 1992

[54] DEVICE FOR THE METERING OF GRANULAR OR POWDERED PRODUCTS AND METHOD OF MIXING RAW RUBBERS USING THIS DEVICE

[75] Inventor: Daniel Laurent, Meylan, France

[73] Assignee: Sedepro, Paris, France

[21] Appl. No.: 725,355

[22] Filed: Jul. 3, 1991

[30] Foreign Application Priority Data

Jul. 12, 1990 [FR] France .................. 90 09011

[51] Int. Cl.⁵ .................. B67B 7/00; G01F 11/10
[52] U.S. Cl. .................. 222/1; 222/345; 222/370; 222/564; 414/217
[58] Field of Search .......... 222/1, 345, 346, 367, 222/370, 234, 226, 408, 410, 414, 564; 414/217, 219, 220, 300, 301; 239/223, 228

[56] References Cited

U.S. PATENT DOCUMENTS

| | | | |
|---|---|---|---|
| 3,826,411 | 7/1974 | Klans | 222/346 X |
| 4,067,483 | 1/1978 | Mucke | 222/370 X |
| 4,391,140 | 7/1983 | Reinhard et al. | |
| 4,747,524 | 5/1988 | Krambrock | |
| 4,913,320 | 4/1990 | Stazhevsky et al. | 222/410 X |
| 4,986,455 | 1/1991 | Rambold | 222/345 X |
| 5,007,564 | 4/1991 | Beth et al. | 222/345 X |

FOREIGN PATENT DOCUMENTS 945665 7/1983 U.S.S.R. .

*Primary Examiner*—Gregory L. Huson
*Attorney, Agent, or Firm*—Brumbaugh, Graves, Donohue & Raymond

[57] ABSTRACT

The material to be metered drops onto a plate 21 which is driven in rotation. This plate 21 is provided on its edge with a cylindrical wall 22 pierced by recesses 24. The plate 21 turns in a cylinder 3 which masks the recesses 24 except at a place where a hole 5 is provided. When the recesses 24 pass opposite the hole 5 they pass behind a screen 4. Each recess 24 is emptied when it passes behind the screen 4 and is otherwise filled under the effect of centrifugal force.

5 Claims, 2 Drawing Sheets

FIG. 1

DEVICE FOR THE METERING OF GRANULAR OR POWDERED PRODUCTS AND METHOD OF MIXING RAW RUBBERS USING THIS DEVICE

BACKGROUND OF THE INVENTION

The present invention relates to the quantitative metering of granular or powdered products. The metered feeding of such products by weight or volume has numerous applications in industry. In certain cases it is highly desirable that the weight or volume measurement can be effected continuously in order to obtain a continuous flow, or one which pulses as little as possible.

While continuous quantitative metering has been fully mastered in the case of liquid products, this is not true in the case of products which are in powdered or even granular form. Numerous systems which operate, in particular, on basis of weighings are already known. However, all the known metering techniques for granular or powdered products have recourse to automatic controls and/or attached means of calculation, making these systems complex, bulky, expensive and/or unreliable in an industrial atmosphere or poorly adapted to operate at variable rates. Furthermore, volumetric systems raise difficulties with respect to the filling and removal of the unit metered volume.

SUMMARY OF THE INVENTION

The present invention proposes a simple, reliable and very precise device for the quantitative metering of such products, and one which is fully adapted to continuous metering.

The device of the present invention for the metered dispensing of granular or powdered products comprises:
product feed means;
a rotor comprising a circular plate onto which the product is delivered by feed means, said plate being provided at its edge with a cylindrical wall pierced by at least one recess;
a cylinder containing the rotor, which is so adjusted with respect to said cylindrical wall as to leave a slight clearance which permits rotation of the rotor within the cylinder, the cylinder having a hole arranged opposite said recess or recesses;
a screen which is fixed with respect to the cylinder and arranged axially at the same level as said opening, radially inwards of the cylindrical wall and so adjusted with respect to the latter as to permit movement of the rotor, said screen extending over an angle beyond both sides of the opening by an amount corresponding to at least the angular opening of the said recesses;
means driving the rotation of said rotor.

DESCRIPTION OF THE DRAWINGS

The following figures and the description thereof illustrate the non-limitative application of the invention to the quantitative metering of carbon black, used as reinforcing filler in rubber mixes.

Figure 1:
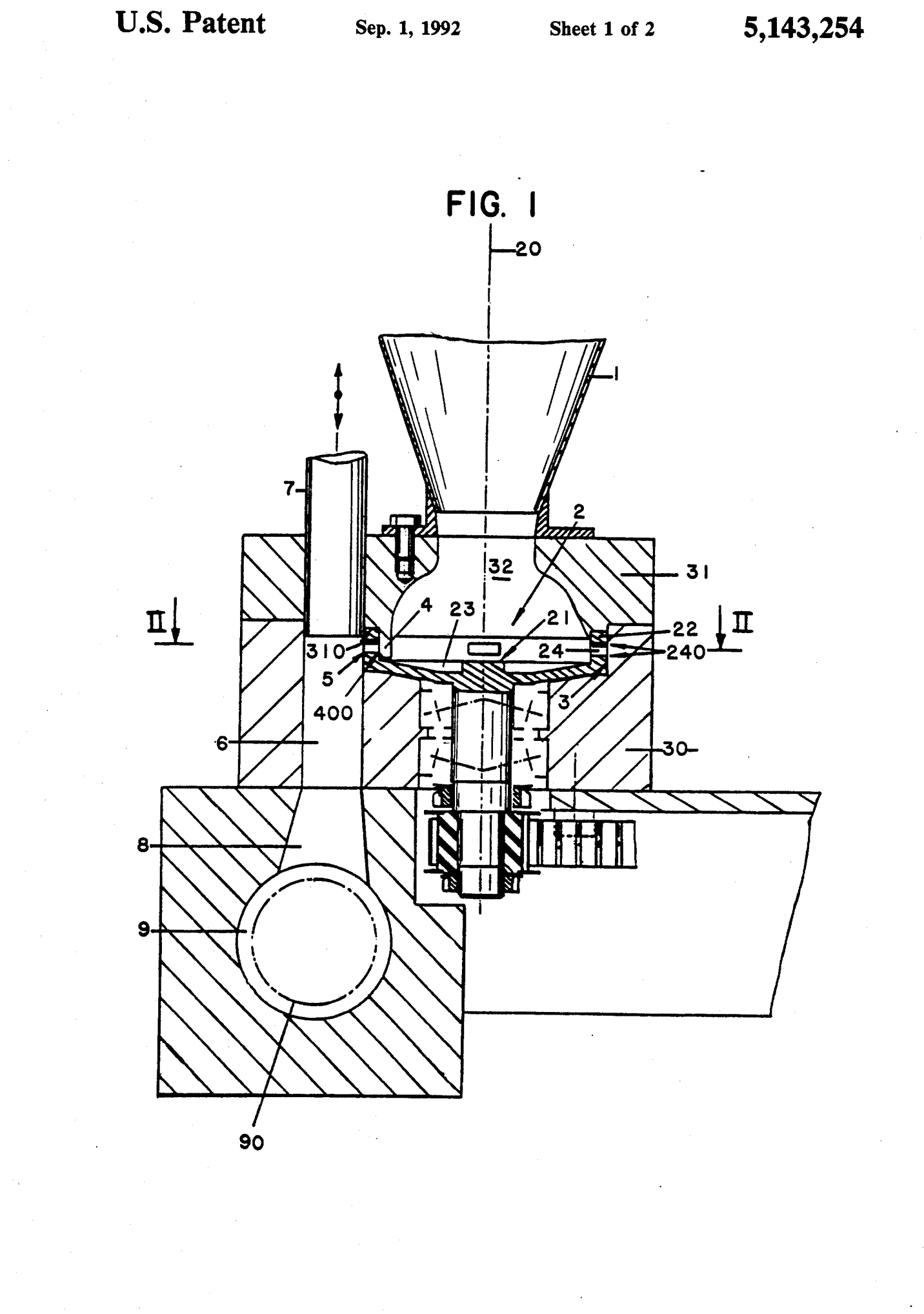

FIG. 1 is a general elevational view showing the device incorporated in rubber mixing installation.

DESCRIPTION OF THE PREFERRED EMBODIMENTS

Figure 2:
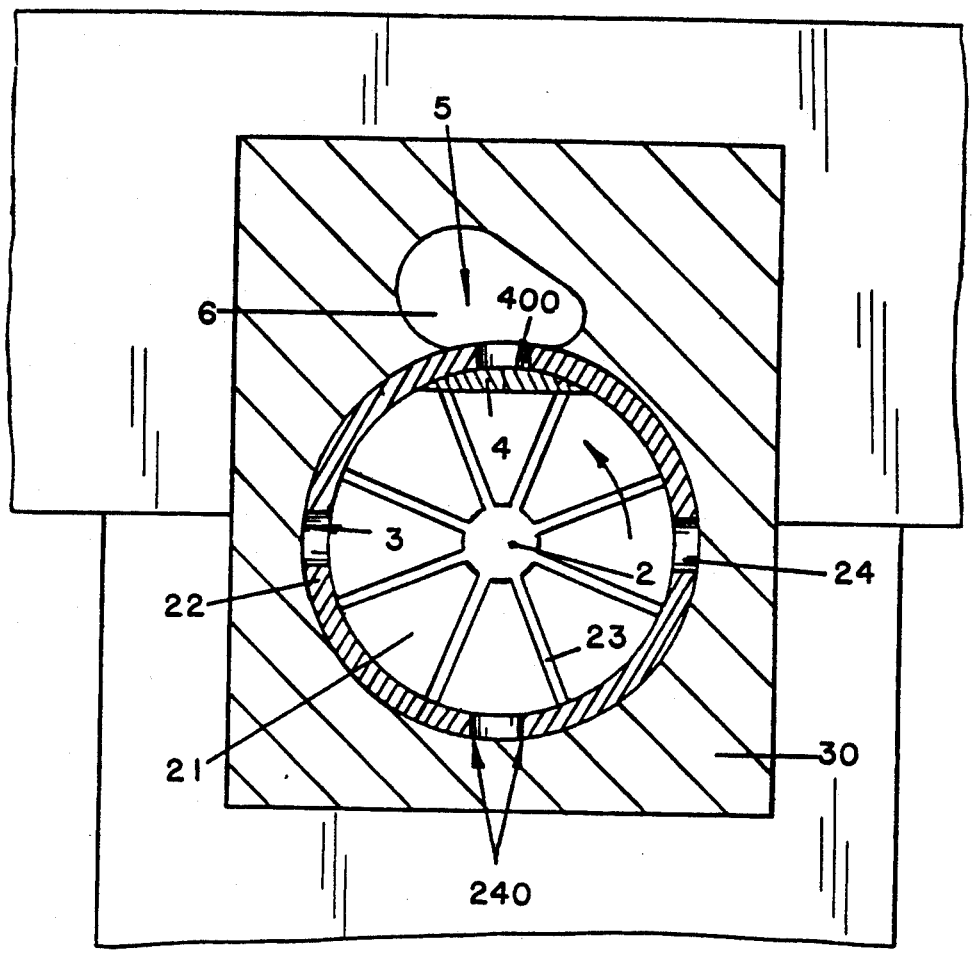
FIG. 2 is a section along the line II—II of FIG. 1.
Figure 3:
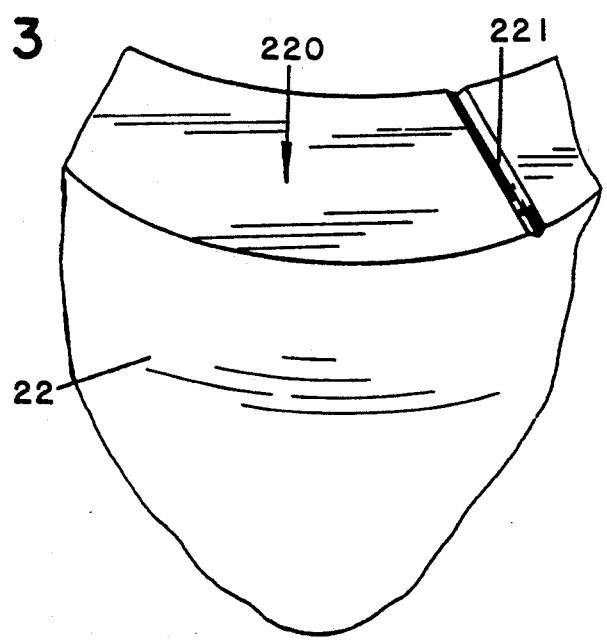
FIG. 3 shows a detail of execution.

The product feed means to the metering apparatus of the present invention is through a filling hopper 1. Upstream of the hopper 1, the average flow of carbon black corresponds at least to the flow supplied by the metering device without other condition than to avoid any interruption of the feed for which the metering device would be incapable of compensating. No precision is required at this stage. In order to avoid a blocking of the hopper as a result of arching (carbon black easily tends to form a arch, resting on two convergent walls), an agitator (not shown) is, for example, provided within the hopper 1. This agitator can, furthermore, be used to drive the carbon black towards the metering device described below. The feed system can, of course, be of very different shape numerous solutions being possible in order to assure a force feeding to the metering device. The design of the feed system depends to a large extent on the product metered, which, in the rubber industry, may be carbon black, sulfur, kaolin, numerous accelerators or the like.

This device is based on the centrifuging of the carbon black, which falls onto a circular plate 21 which is driven in rotation. The circular plate 21 has an outer cylindrical wall 22 and is carried by a rotor 2. The rotor 2 is free to rotate within a cylinder 3 developed in the body 30. An upper bell-shaped cover 31 defines an enclosure 32 in which the carbon black is centrifuged. The axis of rotation 20 of the rotor 2 is vertical and the carbon black drops onto the plate 21 by gravity. It is then driven in rotation, the centrifugal force throwing the carbon black against the cylindrical wall 22 which is firmly attached to the plate 21. In order to guarantee the driving in rotation of the carbon black, radial ribs 23 are advantageously provided on the plate 21, the ribs protruding slightly from said plate 21.

The device operates effectively even when the enclosure 32 is completely filled with carbon black. It is therefore sufficient to stuff the metering device, that is to say, feed it fully in order to be certain that there is no interruption in the feed. The centrifuging effect makes the effect of gravity on the operation of the device negligible. The orientation of the plate 21 can therefore differ greatly from horizontal, the forces dictating the orientation coming rather from the feeding with carbon black of the device.

The cylindrical wall 22 has at least one recess 24 (in this case four) pierced through the cylindrical wall 22. Such a recess constitutes a sort of reservoir of fully definable volume. During the major part of a revolution of the rotor 2, the end of the recess 24 is masked by the cylinder 3. At a given moment, each recess 24 disappears behind a stationary screen 4, which is rigidly attached to the bell-shaped cover 31, which in turn, is connected to the body 30. The screen 4 is arranged axially at the same level as the said recesses 24 and radially inwards of the cylindrical wall 21, leaving, with respect to the latter, the precise clearance necessary to permit movement. It has been found, with the type of carbon black indicated below, that with a clearance of 50 micrometers the carbon black does not enter between the cylinder 3 and the cylindrical wall 22 of the rotor 2. Therefore, the volume of each reservoir formed within the recesses 24 is defined by the faces 240 of the recess 24 in the thickness of the cylindrical wall 22 by the cylinder 3 provided in the body 30, and by the radially outer face 400 of the screen 4, which face is necessarily shaped as a cylindrical arc.

If the feed is sufficient, the carbon black, which is flung against the wall 22 by the centrifugal force, necessarily fills all the recesses 24.

One after the other, the recesses 24 pass behind the screen 4 and then arrive opposite a hole 5 provided in the cylinder 3. The screen 4 preferably extends beyond each side of the hole 5 by at least an amount corresponding to the angular opening of said recesses 24 so that the volume defined by each recess 24 (as explained above) can never be in communication with both the hole 5 and the enclosure 32 containing the carbon black deposited by the feed means. The carbon black is thus metered precisely quantitatively by a precise volumetric removal.

It is to be noted that it is desired to incorporate a given weight of carbon black and a given weight of rubber. After calibration for each type of carbon black which it is desired to add or, in general, for each type of material (granular or powdered products), one effects a weight measurement via a volume measurement.

The metering device of the invention has a possible leak between its rotary member and its stationary member and, therefore, between the end 220 of the cylindrical wall 22 of the rotor 2 and the corresponding end 310 of the cover 31. It is advisable to adjust the clearance to the minimum possible. However, the centrifuging of the carbon black, despite everything, may cause a slight entry of carbon black between rotor 2 and stator, preformed here of the cover 31 and by the body 30 in which the cylinder 3 is produced. In order to avoid progressive clogging, which could damage the metering device, a radial groove 221 has been provided at a point on the end 220 of the cylindrical wall 22. Thus, the carbon black which has started to migrate between the rotor 2 and the cover 31 is collected by scraping and, then, upon each revolution, expelled through the opening 5, which is adapted to this purpose, or else it is expelled through an opening provided to collect said leaking carbon black at any place on the cylinder 3, provided that it can be opposite the groove 221. However, the quantity of carbon black which can leak out is infinitesimal as compared with the volume of carbon black metered and the amount leaked can therefore be rejected in the volume metered.

After metering, as in the example illustrating the invention, the carbon black is incorporated continuously into uncured rubber. The method of continuous mixing of uncured rubber, which consists of continuously introducing an elastomer into a mixing chamber 9 and continuously incorporating therein a precisely metered powdered product, is characterized by the fact that the metering consists in feeding powdered product to a rotor 2 comprising a circular plate 21 onto which the product is delivered by the feed means, said plate being provided at its edge with a cylindrical wall 22 pierced by at least one recess 24; causing the rotor 2 to rotate in a cylinder 3 containing the rotor 2 which is so adjusted with respect to the said cylindrical wall 22 as to leave a slight clearance which permits rotation of the rotor 2 within the cylinder 3, the cylinder 3 having a hole 5 arranged axially opposite the said recess or recesses 24; providing a screen 4 which is stationary with respect to the cylinder 3, axially at the same level as the said hole 5, radially inwards of the cylindrical wall 22 and so adjusted with respect to the latter as to permit movement of the rotor 2, said screen 4 extending over an angle on both sides beyond the hole 5 by an amount corresponding at least to the angular opening of the recesses 24.

The hole 5 leads into a transfer chamber 6 in which a slidable piston 7 pushes the carbon black into a mixing chamber 9. The shape of the transfer chamber 6, as clearly shown in FIG. 2, is dictated by the direction of centrifugation of the carbon black as soon as it is no longer contained by the cylinder 3. The hole 5 is therefore the common interface between the cylinder 3 and the transfer chamber 6. As soon as the piston 7 moves down to deliver the carbon black, it masks the hole 5 and interrupts the quantitative metering, since the recesses 24 can no longer empty themselves of the carbon black which they contain. A rotary mixing member 90, numerous descriptions of which are found in the prior art, moves within the mixing chamber 9.

Due to the descent of the piston 7, the incorporating of the carbon black in the raw rubber can be effected under pressure. Between the transfer chamber 6 and the mixing chamber 9, there is provided a diverging passage 8 in which the cross section of passage of the carbon black increases. Thus, due to the arching effect mentioned above, a non-return effect is naturally obtained.

The assembly for incorporating carbon black into raw rubber lends itself particularly well to the introduction of the carbon black continuously under pressure, making truly continuous preparation of the rubber mixes feasible.

The invention has been shown and described in preferred form and by way of example, and variations and modifications can be made within the scope of the invention. The invention, therefore, is not limited to any particular form or embodiment, except as expressly specified in the claims.

I claim:

1. A metering device for granular or powdered products comprising:
   product feed means;
   a rotor comprising a circular plate onto which the product is delivered by said feed means, said plate having at its edge a cylindrical wall pierced by at least one recess;
   a cylinder containing the rotor so adjusted with respect to the said cylindrical wall as to leave a slight clearance which permits rotation of the rotor within the cylinder, the cylinder having an opening arranged axially opposite the recess or recesses;
   a screen which is fixed with respect to the cylinder and arranged axially at the same level as said opening, radially inwards of the cylindrical wall and so adjusted with respect to it as to permit movement of the rotor, said screen extending over an angle on both sides beyond the opening by an amount corresponding at least to the angular opening of the said recess;
   means driving the rotation of the said rotor.

2. A device according to claim 1, characterized by the fact that the plate has radial ribs.

3. A device according to claim 1 or 2, characterized by the fact that the end of the cylindrical wall comprises a radially oriented groove.

4. A unit for the incorporating of carbon black comprising a mixing chamber and a metering device according to claim 1 or 2, characterized by the fact that it comprises a transfer chamber located downstream of the opening, in which transfer chamber a delivery piston can slide, said transfer chamber being placed in communication with the mixing chamber via a diverging passage.

5. A method for the continuous mixing of uncured rubber by continuously introducing an elastomer into a mixing chamber and continuously incorporating therein a precisely metered powdered product, characterized by the fact that the metering consists in feeding powdered product to a rotor comprising a circular plate onto which the product is delivered by the feed means, said plate having at its edge a cylindrical wall pierced by at least one recess, causing the rotor to turn in a cylinder containing the rotor, so adjusted with respect to said cylindrical wall as to leave a slight clearance which permits the rotation of the rotor within the cylinder, the cylinder comprising an opening disposed axially opposite the said recess or recesses, providing a screen fixed with respect to the cylinder and arranged axially at the same level as said opening radially inwards of the cylindrical wall, so adjusted with respect to the latter as to permit movement of the rotor, the said screen protruding at an angle beyond both sides of the opening by an amount corresponding to at least the angular opening of said recesses.

* * * * *